Sept. 15, 1936.  R. B. SMITH  2,054,549
METAL COATING MECHANISM
Filed Dec. 14, 1933
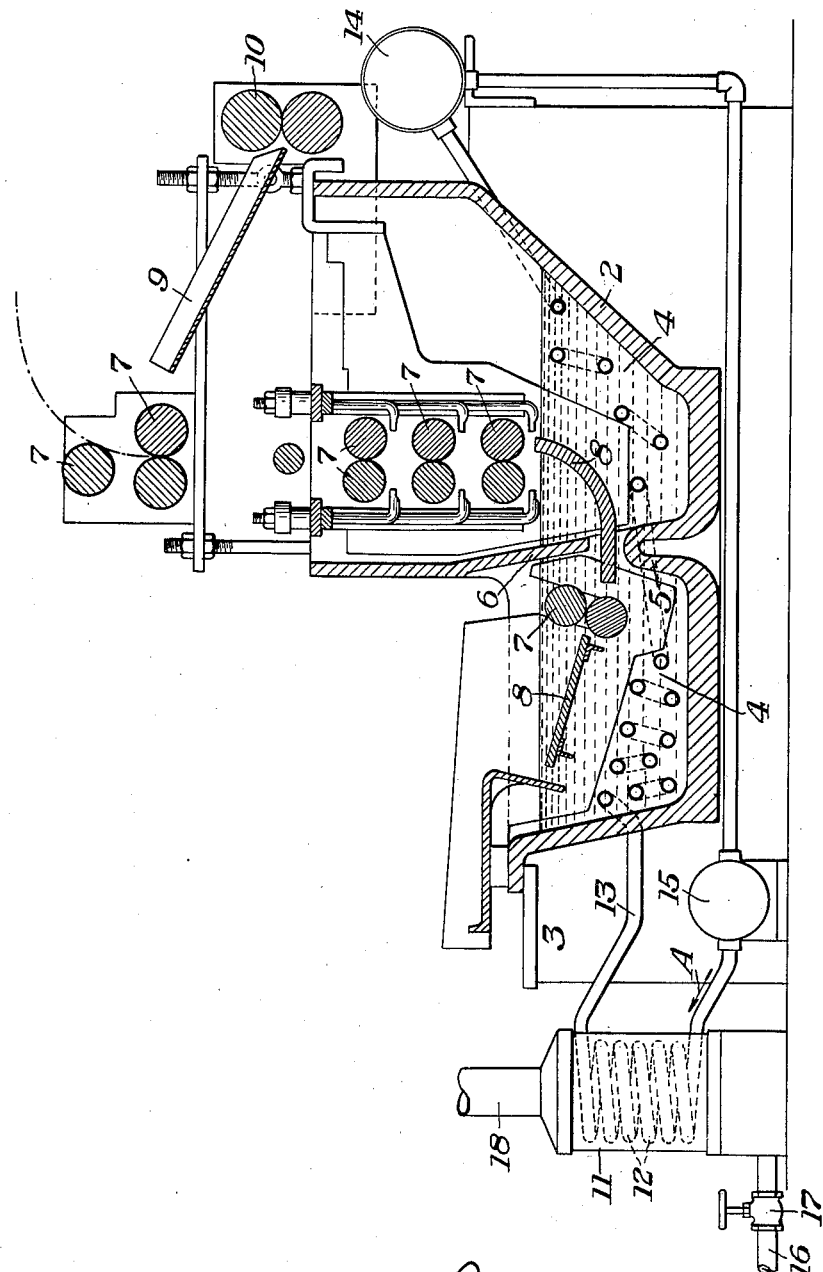
INVENTOR
Reynolds B. Smith
by his attorneys Patented Sept. 15, 1936

2,054,549

UNITED STATES PATENT OFFICE 2,054,549

METAL COATING MECHANISM

Reynolds B. Smith, Wheeling, W. Va., assignor to Wheeling Steel Corporation, Wheeling, W. Va., a corporation of Delaware Application December 14, 1933, Serial No. 702,299

4 Claims. (Cl. 91—12.5)

This invention relates to metal coating mechanism, and more particularly to mechanism for applying a thin even metal coating over the surfaces of metal strips, sheets or articles. The invention relates still more particularly to metal coating pots, such as tin, lead, terne or galvanizing pots, and has particularly to do with provisions for maintaining the metal in the coating bath at a substantially uniform temperature throughout and the regulation of such temperature to reduce dross losses and increase the efficiency of the coating operation.

Metal coating pots, such as tin and galvanizing pots, are ordinarily mounted over a combustion chamber and are heated by the combustion of gas or other fuel in such chamber. The thermal efficiency of such an installation is low and there is a very considerable loss from dross. Dross, which is mainly metal oxide, is formed when the temperature reaches a certain point, and the unevenness of the heating in a direct combustion heated installation such as above referred to, resulting in localized hot spots in the bath, is believed to be mainly responsible for the high dross losses which occur when coating mechanism of such character is used. The dross losses are an important commercial factor. Furthermore, the uneven temperature of the bath prevents obtaining of the most desirable conditions during the coating process.

I provide for more evenly and uniformly heating the coating bath so as to reduce to a considerable extent the dross losses occasioned by non-uniform heating and render the bath more suitable for evenly and uniformly coating material immersed therein. I also materially increase the thermal efficiency of the coating mechanism. The bath is heated indirectly by a heating medium which is brought into thermo-conductive relationship therewith. Preferably a conduit is provided having a portion within the pot and adapted to lie beneath the surface of the bath, such conduit being adapted to contain heating means. Preferably a fluid heating medium traverses the conduit, transmitting its heat therethrough to the bath. The fluid heating medium may be heated externally of the pot and circulated through the conduit and back to the heater. Preferably the conduit is so arranged in the pot as to maintain the bath at a more or less uniform temperature throughout. The conduit may be so arranged as to concentrate heat in the bath at or near the point where the greatest amount of heat is abstracted from the bath, thereby maintaining a substantially uniform temperature throughout the bath by regulating the heat input at the various points in the bath so as to be approximately equal to the heat output at such respective points. A heating medium having a high boiling point and a low specific heat is preferred, although various heating mediums of different characters are suitable.

The temperature to which the metal pot is subjected is considerably lower than when such pot is heated by direct combustion, thus resulting in very substantial reduction of the degradation of the pot due to excessive heat. Furthermore, the pot may be made of much lighter and thinner metal, resulting in a marked economy. The pot may be suitably insulated externally.

Other details, objects and advantages of the invention will become apparent as the following description of a present preferred embodiment thereof proceeds. In the accompanying drawing I have shown a present preferred embodiment of the invention, the drawing being an elevational view, partly in cross section, of a metal coating mechanism.

Referring more particularly to the drawing, there is provided a pot or receptacle 2 mounted on a foundation 3 and adapted to contain a bath of liquid metallic coating material 4, as well known in the art. The structure of the pot itself forms no part of the present invention, and the same is also true with respect to the mechanism for conveying through it material to be coated. The pot has an upwardly extending wall 5 and a downwardly extending wall 6, the latter of which is adapted to intersect the surface of the bath, as is usual in constructions of this character. Rolls 7 and guides 8 are provided for conducting through the pot for coating metal sheets or strips which may be fed thereto in any suitable manner, either mechanically or by hand. All of the construction thus far described is well known in the art and no claim to it is here made.

There is provided a heater 11 within which is mounted a coil 12 forming a part of a conduit 13. The conduit passes within the pot or receptacle 2 wherein it is adapted to lie beneath the surface of the bath in thermoconductive relationship with the metallic coating material. The conduit preferably is disposed deviously or tortuously within the pot and may be arranged in such manner as to maintain a substantially uniform temperature throughout the bath. The conduit is so arranged as to provide a relatively great heating surface in the left-hand side of the pot, viewing the drawing, as the incoming relatively cold material is supplied at this point. Therefore, although a greater amount of heat is supplied at the left-hand side of the pot than at the right-hand side, a greater amount of heat is also abstracted at the left-hand side than at the right-hand side, and the two sides of the pot are maintained at approximately uniform temperatures in operation. An expansion tank 14 may or may not be provided as necessary or desirable, depending upon the character of the heating medium used. The conduit after leaving the pot connects with the expansion tank, if one is provided, and thence extends to a pump 15 which may be of any suitable or well known construction adaptable for the purpose. From the pump the conduit joins the coil 12 so that a recirculatory heating system is thereby provided. Fuel for heating the coil 12 is introduced through a pipe 16 and is controlled by a valve 17. A suitable fuel burner (not shown) is provided in the heater for burning the fuel so as to heat the coil. A flue 18 is provided for carrying off the products of combustion.

When the coating mechanism is being used a substantially constant flow of heating medium through the heating circuit is provided for, the pump receiving the relatively cool heating medium and forcing it in the direction of the arrow A through the coil 12 and conduit 13. The heating medium transmits its heat through the walls of the conduit within the pot, thus heating the coating bath. By regulating the heat supplied to heat the coil in the heater 11 and the speed of the pump 15 the temperature of the bath may be controlled as desired.

The heating medium used does not constitute per se the present invention, and it is preferred to use certain of the well known commercial high temperature fluids, such, for example, as those known by the trade names "Dowtherm C", "Diphenyl" and "NS fluid". These fluids have high boiling points and low specific heats and are well suited for my purpose. The particular heating medium selected will depend upon the desired conditions of operation, particularly with respect to temperature and the nature of the coating material being used. As a further example, mercury might be used as a circulating heating medium.

While I have shown and described a present preferred embodiment of the invention, it is to be distinctly understood that the same is not limited thereto, but may be otherwise variously embodied within the scope of the following claims.

I claim:

1. Metal coating mechanism comprising a receptacle for a bath of liquid metallic coating material through which material to be coated, originally colder than the bath, is passed, and a conduit in said bath through which a heating fluid is passed, said conduit being arranged to present a relativley great heating surface at the portion of the bath where the material to be coated enters and so as to maintain the temperature of the bath substantially uniform throughout.

2. Metal coating mechanism comprising a receptacle for a bath of liquid metallic coating material through which material to be coated, originally colder than the bath, is passed, a conduit in said bath through which a heating fluid is passed, said conduit being arranged to present a relatively great heating surface at the portion of the bath where the material to be coated enters and so as to maintain the temperature of the bath substantially uniform throughout, and means for recirculating the heating fluid in said conduit.

3. Metal coating mechanism comprising a receptacle for a bath of liquid metallic coating material through which material to be coated, originally colder than the bath, is passed, said receptacle having partition means therein past which the material to be coated passes in passing through the bath, and a conduit in said bath through which a heating fluid is passed, said conduit being arranged to present a relatively great heating surface on the entrance side of said partition and so as to maintain the temperature of the bath substantially uniform throughout.

4. Metal coating mechanism comprising a tin pot generally of standard design and having conveyor rolls for conveying sheets through a bath of molten tin contained in the pot and partition means therein past which the sheets are passed in passing through the bath, and a conduit in the bath through which a heating fluid is passed, the conduit being arranged to present a relatively great heating surface on the entrance side of said partition and so as to maintain the temperature of the bath substantially uniform throughout.

REYNOLDS B. SMITH.